G. FRANK.
PISTON.
APPLICATION FILED AUG. 11, 1911.

1,054,345.

Patented Feb. 25, 1913.

2 SHEETS—SHEET 1.

Witnesses
G. F. Tolon
Frances Keroes

Inventor
Gustav Frank
Geo. W. Sues
By
Attorney

G. FRANK.
PISTON.
APPLICATION FILED AUG. 11, 1911.

1,054,345.

Patented Feb. 25, 1913.
2 SHEETS—SHEET 2.

Witnesses
G. T. Tobson.
Frances Keroes

Inventor
Gustav Frank

By Geo. W. Sues.
Attorney

UNITED STATES PATENT OFFICE.

GUSTAV FRANK, OF JEFFERSON, TEXAS, ASSIGNOR OF ONE-HALF TO MARTIN J. WHELAN, OF JEFFERSON, TEXAS.

PISTON.

1,054,345. Specification of Letters Patent. Patented Feb. 25, 1913.

Application filed August 11, 1911. Serial No. 643,612.

*To all whom it may concern:*

Be it known that I, GUSTAV FRANK, a citizen of the United States, and a resident of Jefferson, in the county of Marion and State of Texas, have invented certain new and useful Improvements in Pistons, of which the following is a specification, reference being had to the accompanying drawings.

This invention has relation to an improved expanding piston employed in connection with pumps; and the object of my invention is to provide a device of this general character, of a simple and inexpensive nature and of a compact and durable construction, which shall be capable of convenient and accurate adjustment in position upon a piston rod to adjustably receive the packing rings in a manner permitting the active rings being expanded, to take up and compensate the wearing away of the parts.

With these and other objects in view the present invention consists in the combination and arrangement of parts as will be hereinafter more fully described and finally pointed out in the appended claims, it being further understood that changes in the specific structure shown and described may be made within the scope of the claims, without departing from the spirit of the invention.

Figure 1:
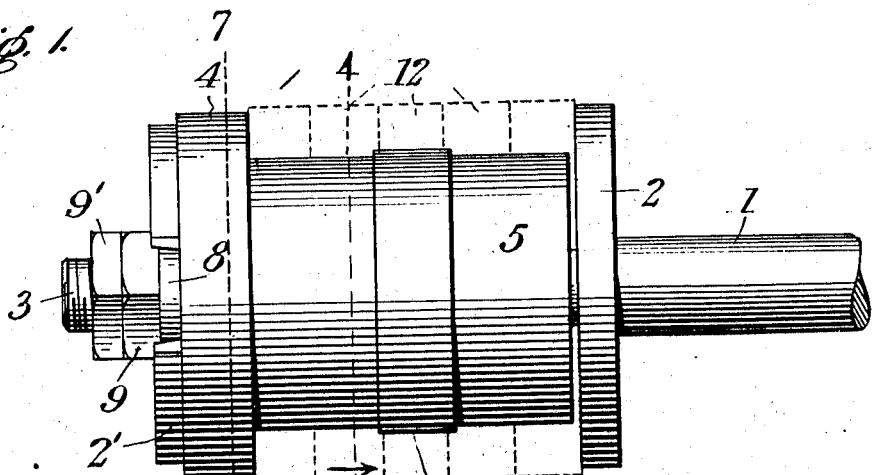
Figure 2:
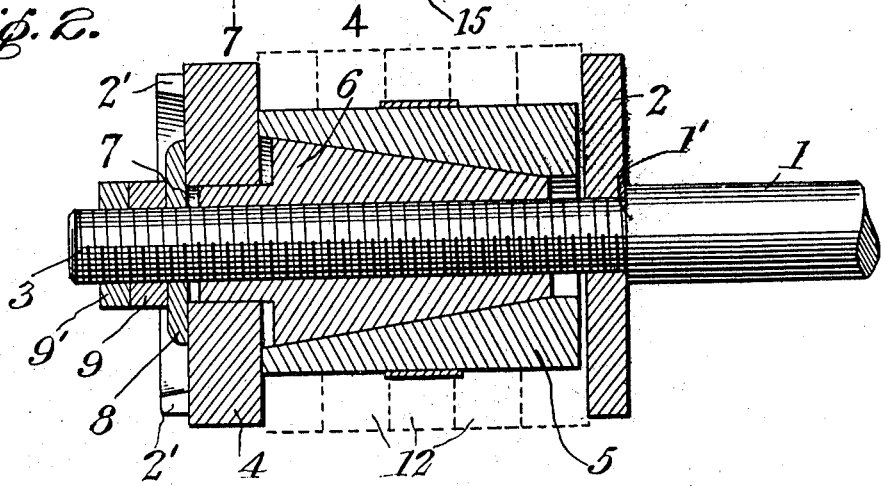
Figure 3:
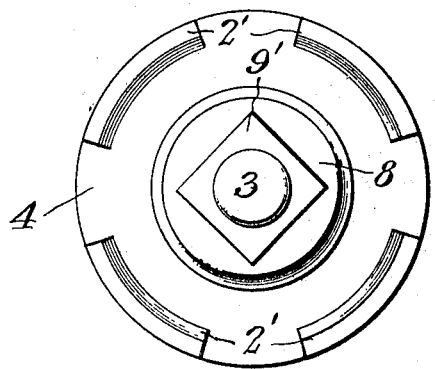
Figure 4:
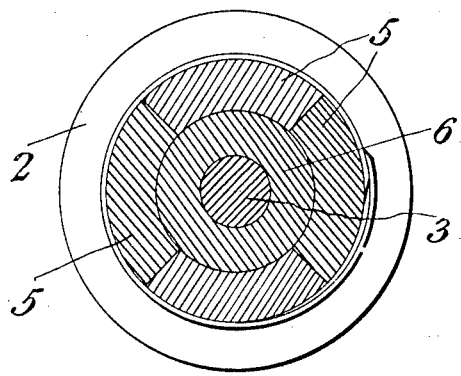
Figure 5:
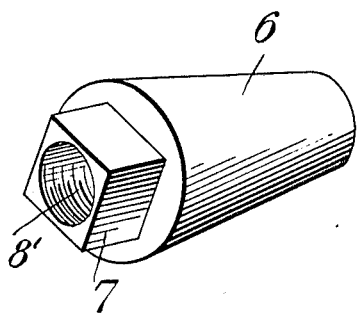
Figure 6:
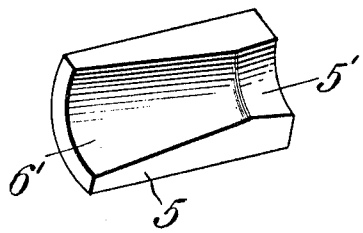
Figure 7:
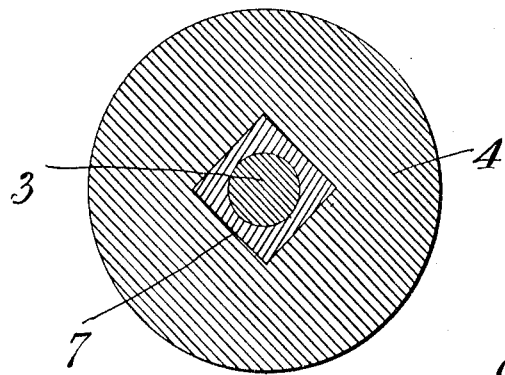

In the accompanying drawings forming a part of this specification, and in which like numerals of reference indicate similar parts in the several views: Figure 1, shows an elevational view with parts in section of a pump piston embodying my invention, the packing rings being eliminated and showing the spring snap ring in position. Fig. 2, shows a lengthwise sectional view through Fig. 1. Fig. 3, shows an end view. Fig. 4, is a section on line 4, 4, of Fig. 1. Fig. 5, shows a perspective view of the truncated cone. Fig. 6, is a perspective view of one of the segmental core members, of which four are employed, and Fig. 7, is a section on line 7, 7, of Fig. 1.

In my present invention I aim to provide a piston especially adapted to be used in connection with pumps, of few parts, and constructed so that the packing rings can at all times be quickly and synchronously expanded to insure a water tight union between the piston and the cylinder.

In the accompanying drawings, the numeral 1, designates a piston rod which has one end 3, reduced to provide the stop shoulder 1', shown in Fig. 2, this reduced end being threaded. Loosely held upon this threaded stem 3, and stopped against the shoulder 1', is the stop plate 2, of a diameter slightly less than the diameter of the cylinder in connection with which the piston is used. Threading upon the stem 3, is the truncated cone 6, shown in detail in Fig. 5, having a middle lengthwise running threaded bore 8', and at its largest end being provided with the square or angular boss 7. This cone 6, threads upon the reduced end of the piston rod, with its smallest end proximal to the disk 2, as shown in Fig. 2.

Adjustably and slidably held upon the cone 6, is a quadrigeminal segmental core comprising four similar members 5, the combined members when placed upon the cone 6, presenting an outer cylindrical surface. Each core member is provided with an inner concave bearing surface 6', shown in Fig. 6, and a cylindrical surface 5'. These four equiformed core members give support to the packing rings 12, shown in dotted lines in Figs. 1 and 2, these rings being of a suitable width. As shown in Fig. 1, the core members 5, are of a length less than the combined thickness of the packing rings 12, while the cone 6, in turn is of a length less than the cores.

Held upon the square boss 7, is the follow plate 4, of a diameter less than the inner diameter of the cylinder in connection with which this piston is used. This follow plate is slidably held upon the boss 7, and is employed to clasp the packing rings 12, against the stop plate 2. This follow plate 4, is provided with the spaced outstanding flanges 2', serving a specific purpose, in that a spanner wrench may be placed between the spaced flanges, in actuating the cores. Held upon the stem 3, and against the follow plate 4, is the washer 8, and working upon this washer 8, is the set nut 9, which is held in place by means of the lock nut 9', as clearly shown in Figs. 1 and 2.

In the operation of the piston, when the packing rings 12, wear away, owing to the grit and other impurities within the water, and become loose within the cylinder, they can be expanded, in simply loosening the nuts 9 and 9', and adjusting a spanner wrench between the spaced flanges 2'. In rotating the follow plate 4, the cone 6, is rotated, resulting in the cone being advanced. As the cone advances, it spreads the core members which in turn synchronously expand the packing rings to bring their outer surfaces into water tight contact with the cylinder surface. After the rings 12, have been properly expanded, they are again clamped between the two plates 2 and 4, by means of the nut 9.

From the foregoing it will be noticed that the cone 6, is employed to expand the rings, being rotated through the intermedium of the follower 4, and that the follow plate 4, in connection with the nut 9, is employed to clamp the packing rings against the member 2. The boss 7, should be shorter than the thickness of the follower 4, but a little longer than the possible incursion of said cone, that is the full distance the cone 6, is to travel, so that the boss will never become detached from the actuating follower 4.

In order to hold the segmental cones in position while the packing is removed, I employ a flat spring snap ring 15, shown in Fig. 1, which can be easily removed or placed in position. While I have shown and described four core sections, it should be understood that a greater or less number may be employed.

A pump piston constructed according to my invention is simple and comparatively inexpensive and both durable and efficient in operation, and the expanding of the packing rings, as well as the clamping of the rings between the plates, can be accomplished with ease, accuracy and despatch. An incident of convenience to this arrangement of expanding the rings, is that no parts of the mechanism need be removed, it simply being necessary to loosen a nut, in order to advance the cone.

Having thus described my said invention, what I claim as new and desire to secure by United States Letters Patent is:

1. A pump piston having in combination, a threaded rod, a stop plate upon said rod, a cone threading upon said rod and toward said plate having an extending angular boss, a plurality of core members held to said cone, said cone being of a length less than said cores, a snap ring holding said cores to said cone, a packing ring upon said cores and snap ring, a follow plate upon said boss, and working against said packing rings said boss of a length greater than the possible incursion of said cone but of a length less than the thickness of said follow plate, and a nut upon said rod to hold said follow plate to said packing rings.

2. A pump piston having in combination, a threaded rod, a stop plate upon said rod, a cone threading upon said rod and toward said plate having an extending angular boss, a plurality of core members held to said cone said cone being of a length less than said cores, a packing ring upon said cores, a follow plate upon said boss and working against said packing rings said boss being of a length greater than the possible incursion of said cone but of a length less than the thickness of said follow plate, said follow plate having spaced spanner receiving flanges, and a nut upon said rod to hold said follow plate to said packing ring.

3. A pump piston having in combination a threaded rod, a stop plate upon said rod, a cone threading upon said rod and toward said plate having an extending angular boss, a plurality of core members held to said cone said cone being of a length less than said cores, means to hold said cores to said cone, a packing ring upon said cores, a follow plate upon said boss and working against said packing rings said boss being of a length greater than the possible incursion of said cone but of a length less than the thickness of said follow plate, said follow plate having spaced spanner receiving flanges, and a nut upon said rod to hold said follow plate to said packing rings.

In testimony whereof I affix my signature, in presence of two witnesses.

GUSTAV FRANK.

Witnesses:
L. E. PURSSELL,
J. C. KISTENMACHER.